(12) United States Patent
Wong

(10) Patent No.: US 9,128,683 B2
(45) Date of Patent: Sep. 8, 2015

(54) PROTECTIVE CASE FOR ELECTRONIC EQUIPMENT

(71) Applicant: Chih-Juh Wong, New Taipei (TW)

(72) Inventor: Chih-Juh Wong, New Taipei (TW)

(*) Notice: Subject to any disclaimer, the term of this patent is extended or adjusted under 35 U.S.C. 154(b) by 58 days.

(21) Appl. No.: 14/093,563

(22) Filed: Dec. 2, 2013

(65) Prior Publication Data

US 2015/0153791 A1    Jun. 4, 2015

(51) Int. Cl.
*G06F 1/20* (2006.01)
*G06F 1/16* (2006.01)
*A45C 11/00* (2006.01)

(52) U.S. Cl.
CPC ............... *G06F 1/20* (2013.01); *G06F 1/1615* (2013.01); *G06F 1/1658* (2013.01); *A45C 2011/003* (2013.01); *A45C 2200/15* (2013.01)

(58) Field of Classification Search
CPC ..... G06F 1/1658; G06F 1/1615; G06F 1/161; G06F 1/1633; G06F 1/20; G06F 1/203; H05K 7/20954–7/20963; A45C 2011/003; A45C 2200/15; A45C 5/02; B23P 15/26; F28F 3/005
See application file for complete search history.

(56) References Cited

U.S. PATENT DOCUMENTS

| | | | |
|---|---|---|---|
| 8,607,976 B2 * | 12/2013 | Wu et al. | 206/320 |
| 8,746,449 B2 * | 6/2014 | Gallagher et al. | 206/320 |
| 8,872,023 B2 * | 10/2014 | Chang et al. | 174/50 |
| 8,905,231 B2 * | 12/2014 | Couch et al. | 206/320 |
| 8,960,421 B1 * | 2/2015 | Diebel | 206/45.2 |
| 2014/0139989 A1 * | 5/2014 | Mori et al. | 361/679.09 |
| 2014/0291175 A1 * | 10/2014 | Chung et al. | 206/45.23 |
| 2015/0041341 A1 * | 2/2015 | Marshall et al. | 206/45.2 |
| 2015/0083615 A1 * | 3/2015 | Lay et al. | 206/45.24 |

* cited by examiner

*Primary Examiner* — Michael Zarroli

(57) ABSTRACT

A protective case for electronic equipment contains a body, a plurality of protecting ribs and plural retaining portions. Among the body, the plurality of protecting ribs, and the plural retaining portions is defined an accommodating space. The body includes a fixing block having a free end extending out of the body, the fixing block has a first hole corresponding to a second hole of the body, such that the electronic equipment is mounted in the accommodating space so that the plural retaining portions retain with the peripheral side of the electronic equipment, and the fixing block is slid, the locking portion retain with the peripheral side of the electronic equipment, the first hole aligns with the second hole, and a fastening protrusion of a lock is inserted into the second hole and the first hole, hence the electronic equipment is locked by the plural retaining portions and the locking portion.

9 Claims, 16 Drawing Sheets

PROTECTIVE CASE FOR ELECTRONIC EQUIPMENT

FIELD OF THE INVENTION

The present invention relates to a protective case for electronic equipment which is used to dissipate heat of electronic equipment.

BACKGROUND OF THE INVENTION

A conventional protective case is applied to prevent electronic equipment from scratch, so it contacts with an upper surface and a lower surface of the electronic equipment tightly. However, such a contacting way will stop heat of the electronic equipment from being dissipated. To solve this problem, the protective case is removed from the electronic equipment, thus losing the protective case easily.

The present invention has arisen to mitigate and/or obviate the afore-described disadvantages.

SUMMARY OF THE INVENTION

The primary object of the present invention is to provide a protective case for electronic equipment which protects electronic equipment, dissipates heat, and prevents from electromagnetic radiation.

To obtain the above objectives, a protective case for electronic equipment contains:

a body, a plurality of protecting ribs extending upwardly from a peripheral side of the body, plural retaining portions bending inwardly from free ends of the plurality of protecting ribs and fastening with the electronic equipment, and among the body, the plurality of protecting ribs, and the plural retaining portions being defined an accommodating space for receiving the electronic equipment, the body including a fixing block disposed on the peripheral side thereof and having a free end extending out of the body, and the fixing block having a first hole formed thereon and corresponding to a second hole of the body.

Thereby, the electronic equipment is mounted in the accommodating space so that the plural retaining portions retain with the peripheral side of the electronic equipment, and the fixing block is slid so that the locking portion retain with the peripheral side of the electronic equipment, and the first hole aligns with the second hole of the receiving cavity; and a fastening protrusion of a lock is inserted into the second hole and the first hole so that the fixing block is fixed, and the electronic equipment is locked by the plural retaining portions and the locking portion.

DETAILED DESCRIPTION OF THE PREFERRED EMBODIMENTS

Figure 1:
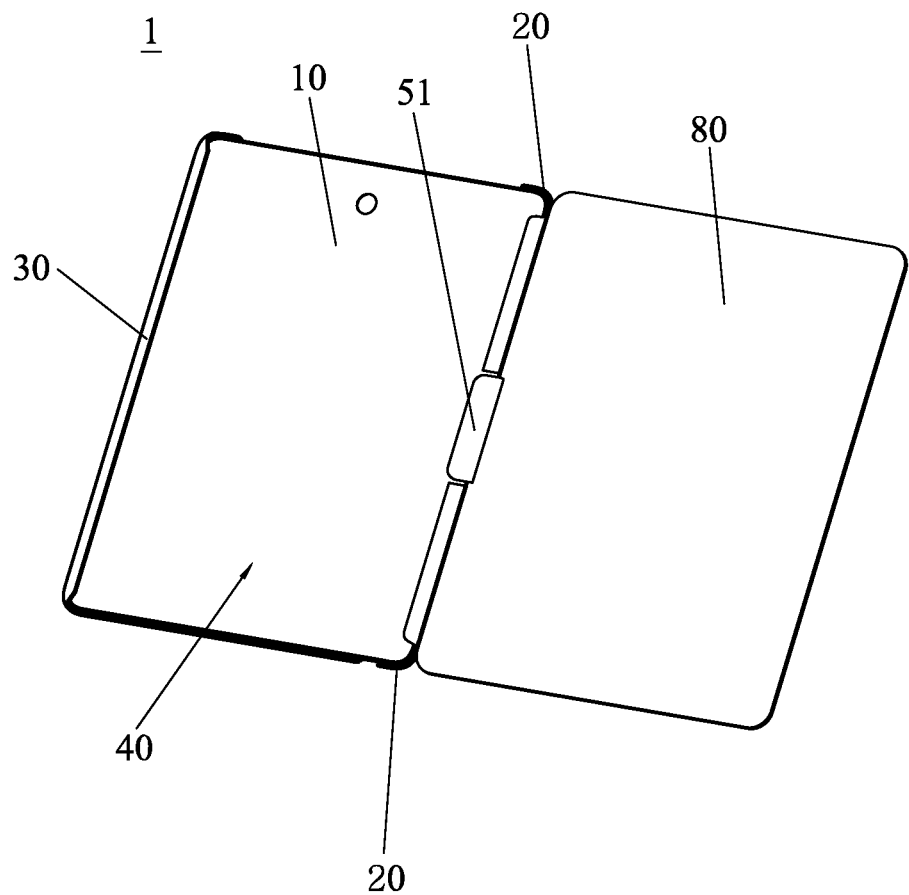
FIG. 1 is a perspective view showing the assembly of a protective case for electronic equipment according to a first embodiment of the present invention.
Figure 2:
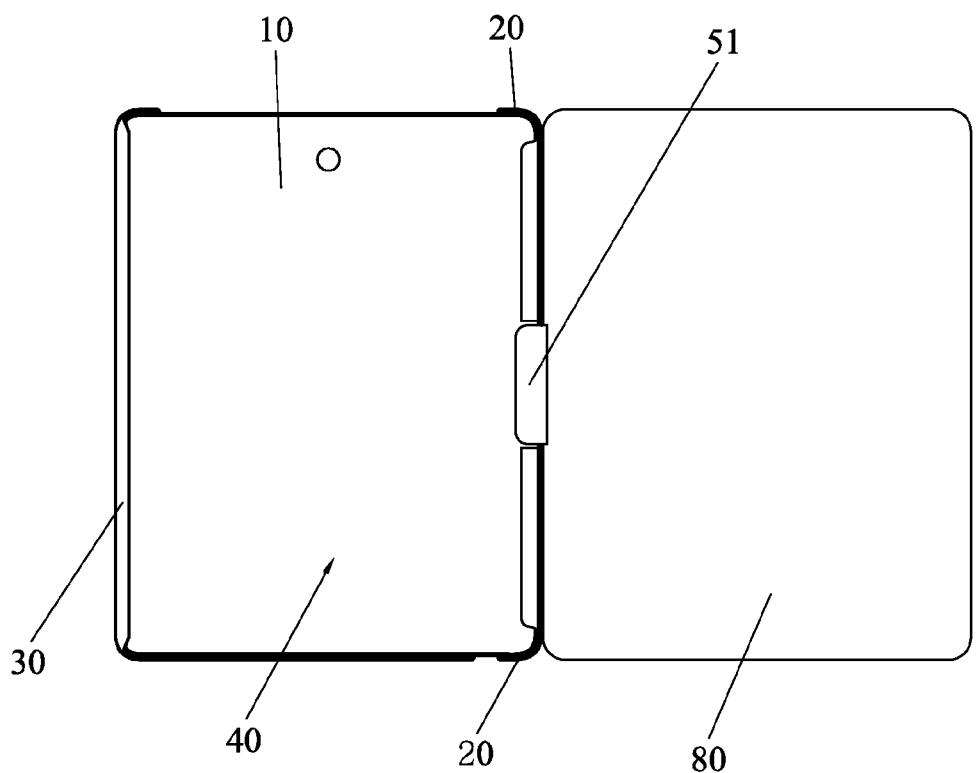
FIG. 2 is a front plan view of FIG. 1.
Figure 3:
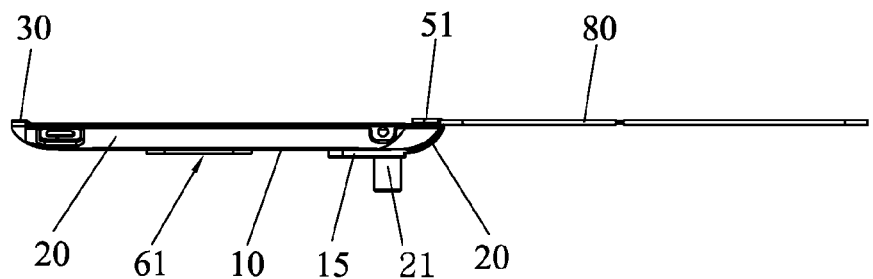
FIG. 3 is a side plan view of FIG. 1.

Referring further to FIGS. 1-7, a protective case 1 for electronic equipment according to a first embodiment of the present invention is fasten on electronic equipment and is used so as to protect the electronic equipment. The protective case 1 comprises a body 10, a plurality of protecting ribs 20 extending upwardly from a peripheral side of the body 10, plural retaining portions 30 bending inwardly from free ends of the plurality of protecting ribs 20 and fastening with the electronic equipment, and among the body 10, the plurality of protecting ribs 20, and the plural retaining portions 30 is defined an accommodating space 40 for receiving the electronic equipment. The body 10 includes a fixing block 50 disposed on the peripheral side thereof and having a free end extending out of the body, and the fixing block 50 is formed in a U shape and has a locking portion 51 bending toward the accommodating space 40 and a first hole 52 formed thereon and corresponding to a second hole 151 of the body 10. After the electronic equipment is fixed in the accommodating space 40, the fixing block 50 is moved so that the locking portion 51 retains with a peripheral side of the electronic equipment, and the first hole 52 is aligned with the second hole 151, a fastening protrusion 21 of an lock 2 is inserted into the second hole 151 and the first hole 52 to lock the electronic equipment.

The plurality of protecting ribs 20 are made of plastic material so that the electronic equipment is positioned in the protective case 1 easily, and the plural retaining portions 30 is applied to lock the protective case 1 and the electronic equipment securely. Preferably, the peripheral side of the body 10 and peripheral sides of the plurality of protecting ribs 20 are connected with a buffer layer made of flexible material so that the buffer layer absorbs external stress to obtain buffering effect and non-slip effect.

Figure 4:
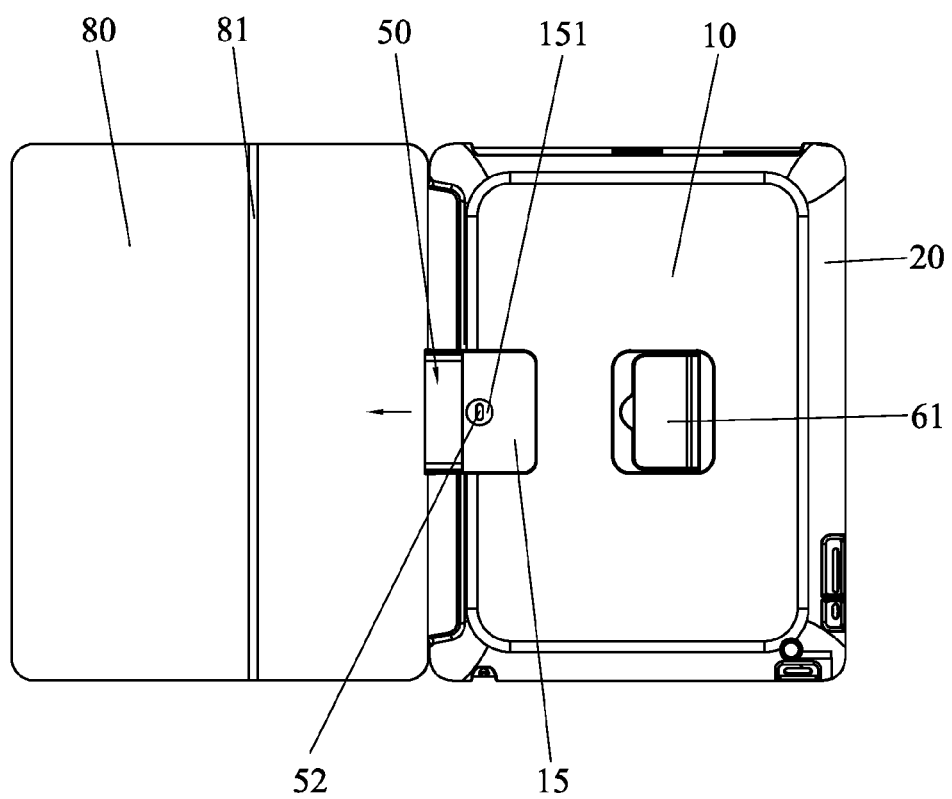
FIG. 4 is a back plan view of FIG. 1.
Figures 5, 6:
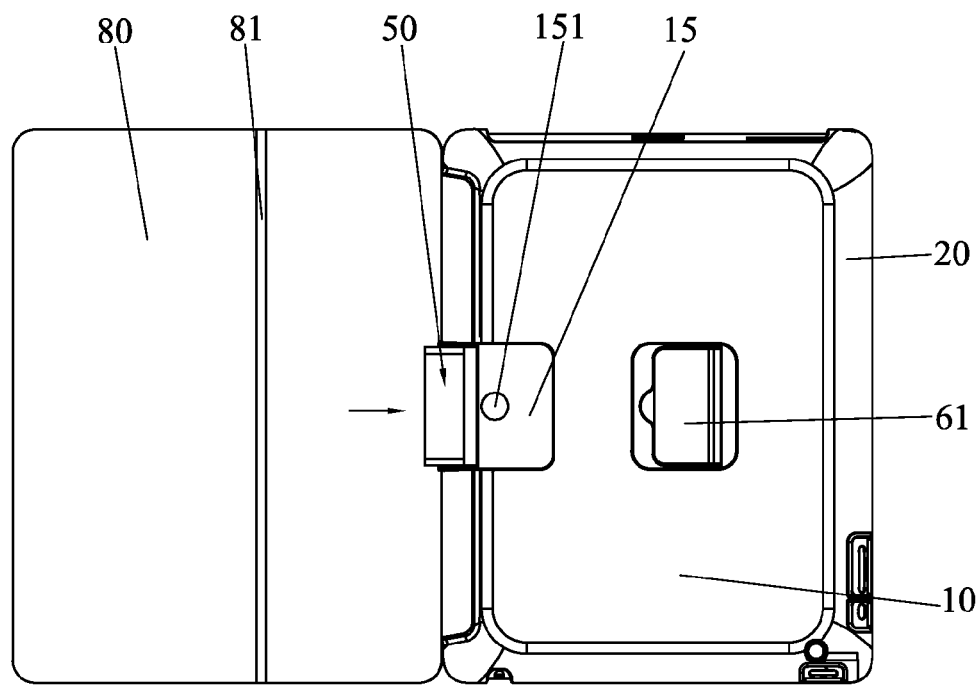
FIG. 5 is another back plan view of FIG. 1.
FIG. 6 is a perspective view showing the assembly of a lock for matching with the protective case for electronic equipment according to the first embodiment of the present invention.

Referring to FIGS. 4 and 5, the body 10 includes a receiving cavity 15 defined on a back surface thereof and corresponding to the fixing block 15, and the receiving cavity 15 has an opening for siding the fixing block 50, hence after the fixing block 50 is received in the fixing block 12, the second hole 151 aligns with the first hole 52, and the fastening protrusion 21 of the lock 2 is inserted into the second hole 151 and the first hole 52 so as to lock the fixing block 50, and the electronic equipment is locked by the plural retaining portions 30 and the locking portion 51. In contrast, after the fixing block 50 is unlocked and slides along an arrow in FIG. 4, the locking portion 51 removes from the electronic equipment as shown in FIG. 5, thus removing the electronic equipment from the protective case 1.

The protective case 1 can cooperate with locks of various types.

Figure 7:
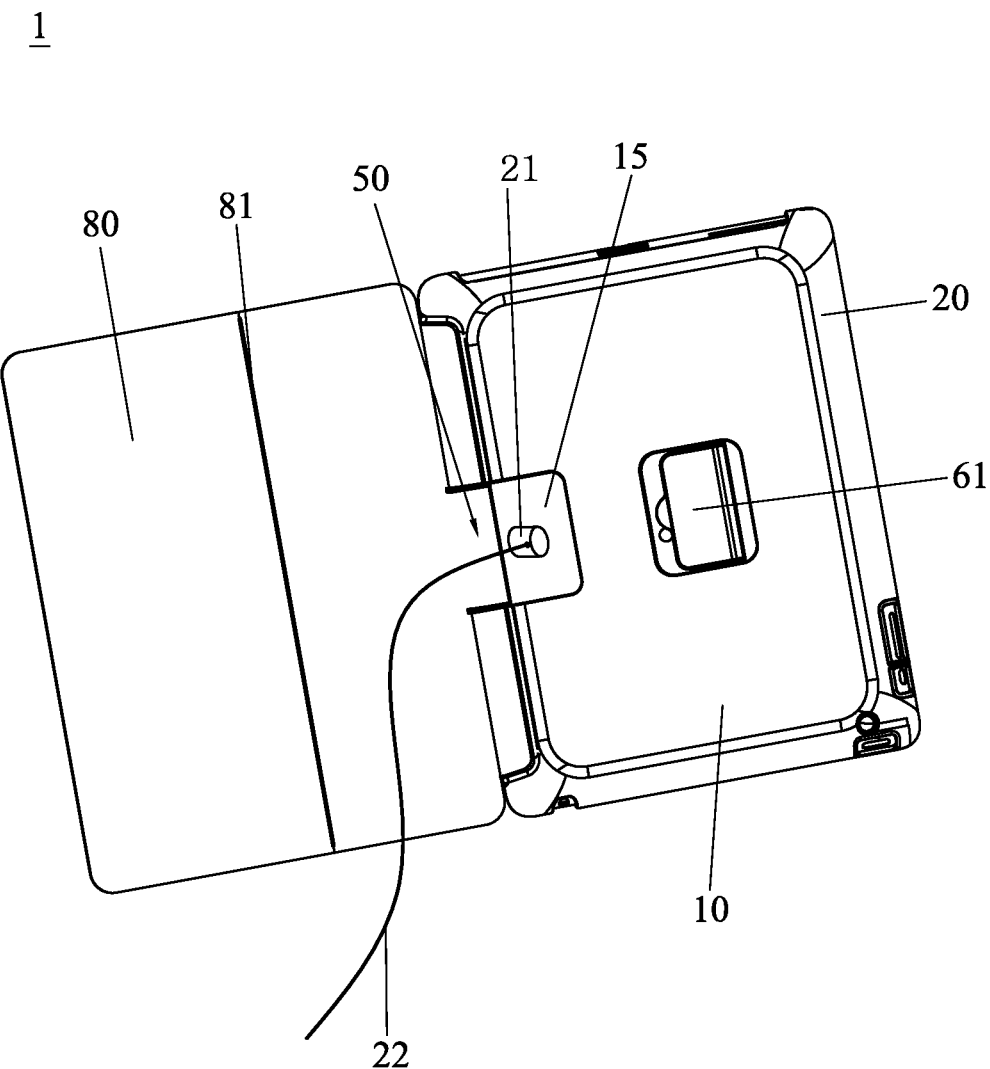
FIG. 7 is a perspective view showing the application of the lock and the protective case for electronic equipment according to the first embodiment of the present invention.
Figure 8:
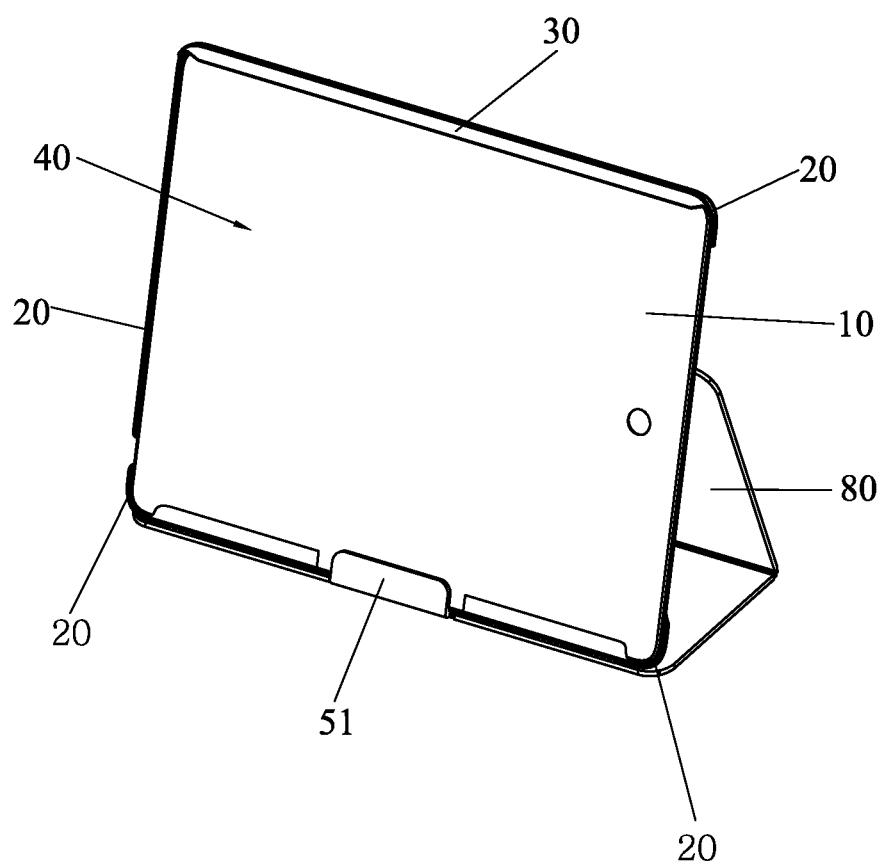
FIG. 8 is a perspective view of the operation of FIG. 1.
Figure 9:
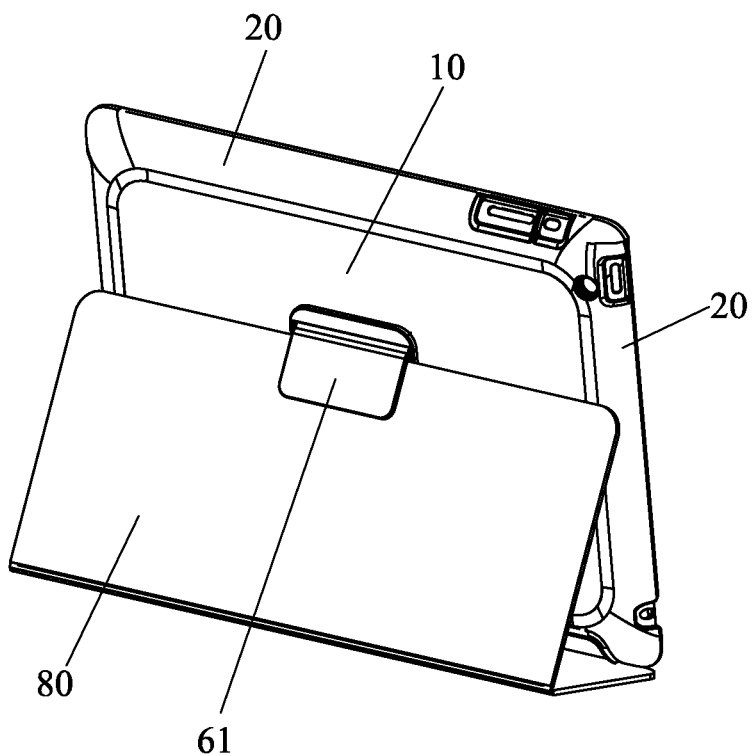
FIG. 9 is another perspective view of the operation of FIG. 1.
Figure 10:
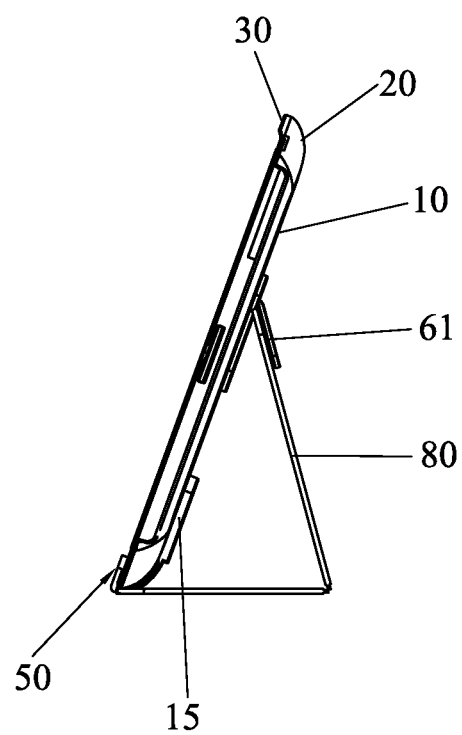
FIG. 10 is also perspective view of the operation of FIG. 1.

As shown in FIGS. 6 and 7, the lock 2 includes the fastening protrusion 21, a cable 22, a housing 23, and a fastener 24. The fastening protrusion 21 and the housing 23 are coupled with two ends of the cable 22, the housing 23 is applied to accommodate the cable 22, and the fastener 24 is joined with the housing 23 and an object. The fastener 24 matches with the first hole 52 to lock or unlock the object; wherein the fastener 24 cooperates with the first hole 52 to unlock a key or password.

As illustrated in FIGS. 1-6, in operation, the fixing block 50 is slid along the arrow in FIG. 4, and the electronic equipment is mounted in the accommodating space 40 so that the plural retaining portions 30 retain with the peripheral side of the electronic equipment. When the fixing block 50 is slid along the arrow in FIG. 5, the locking portion 51 retain with the peripheral side of the electronic equipment, and the first hole 52 aligns with the second hole 151 of the receiving cavity 15 (as shown in FIG. 4); and the fastening protrusion 21 of the lock 2 is inserted into the second hole 151 and the first hole 52 so that the fixing block 50 is fixed, and the electronic equipment is locked by the plural retaining portions 30 and the locking portion 51. The fastener 24 of the lock is fitted on or joined with the object so as to protect the electronic equipment. As desiring to remove the electronic equipment from the protective case 1, the fastener protrusion 21 of the lock 2 is unlocked by unlocking the passage or by using the key, and then the fastening protrusion 21 is removed from the protective case 1, thereafter the fixing block 51 is slid along the arrow in FIG. 4 so that the locking portion 51 is removed from the electronic equipment (as illustrated in FIG. 5), thereby removing the electronic equipment from the protective case 1.

With reference to FIGS. 1-10, the electronic equipment further comprises a rotary cover 80 coupled with one side of the body 10 and corresponding to the body 10. The rotary cover 80 covers on the body 10 so as to protect the electronic equipment and includes at least one crease line 81 folded to form a support rack, and the electronic equipment on the protective case 1 is placed on a platform so as to view the electronic equipment by ways of the support rack. The at least one crease line 81 is in any one of a double intersected cross shape, a Y shape, a triangle shape, and a polygon shape.

In this embodiment, the rotary cover 80 includes a straight crease line 81, and the body 10 includes a locking mechanism secured on the back surface thereof. The locking mechanism is applied to retain with the rotary cover 80 after folding the rotary cover 80 along the straight crease line 81 so that the rotary cover 80 supports the body 10. The locking structure is an engaging piece 61 connected with the back surface of the body 10, and between the engaging piece 61 and the back surface of the body 10 is defined an engagement area, and the rotary cover 80 is folded and engaged in the engagement area.

Preferably, the rotary cover 80 is a leather layer and has anti-slip function so that the electronic equipment is held securely and is protected effectively. In addition, a film made of polyethylene terephthalate (PET) is formed on the leather layer to protect the leather layer.

Figure 11:
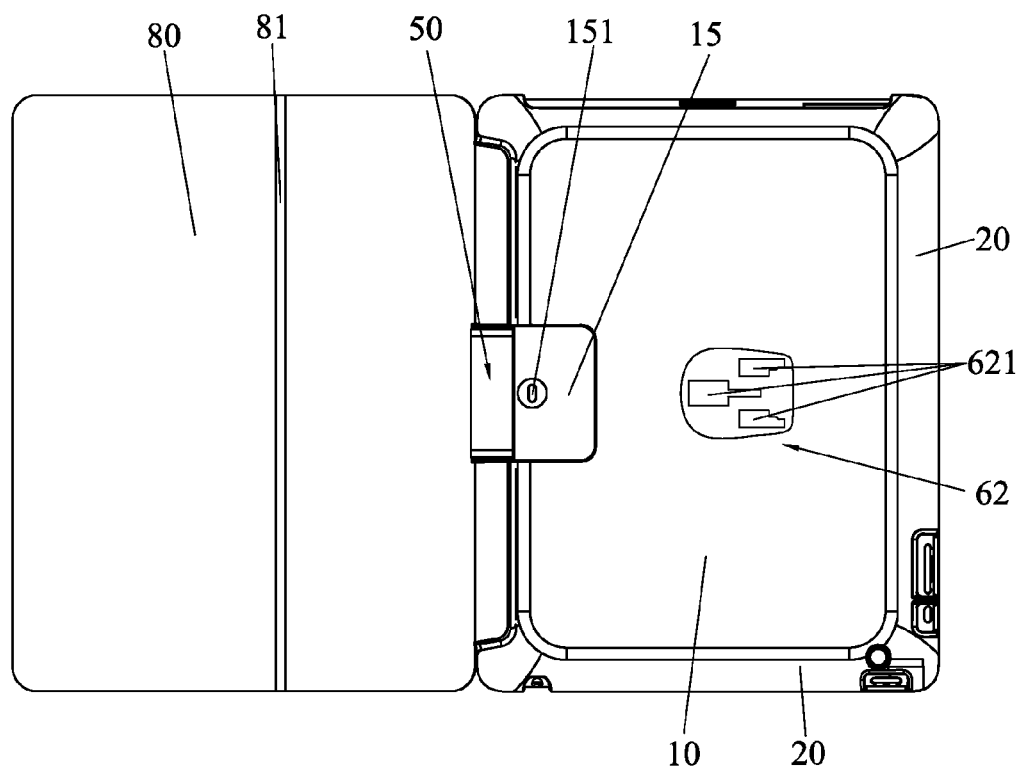
FIG. 11 is a top plan view showing the assembly of a protective case for electronic equipment according to a second embodiment of the present invention.
Figure 12:
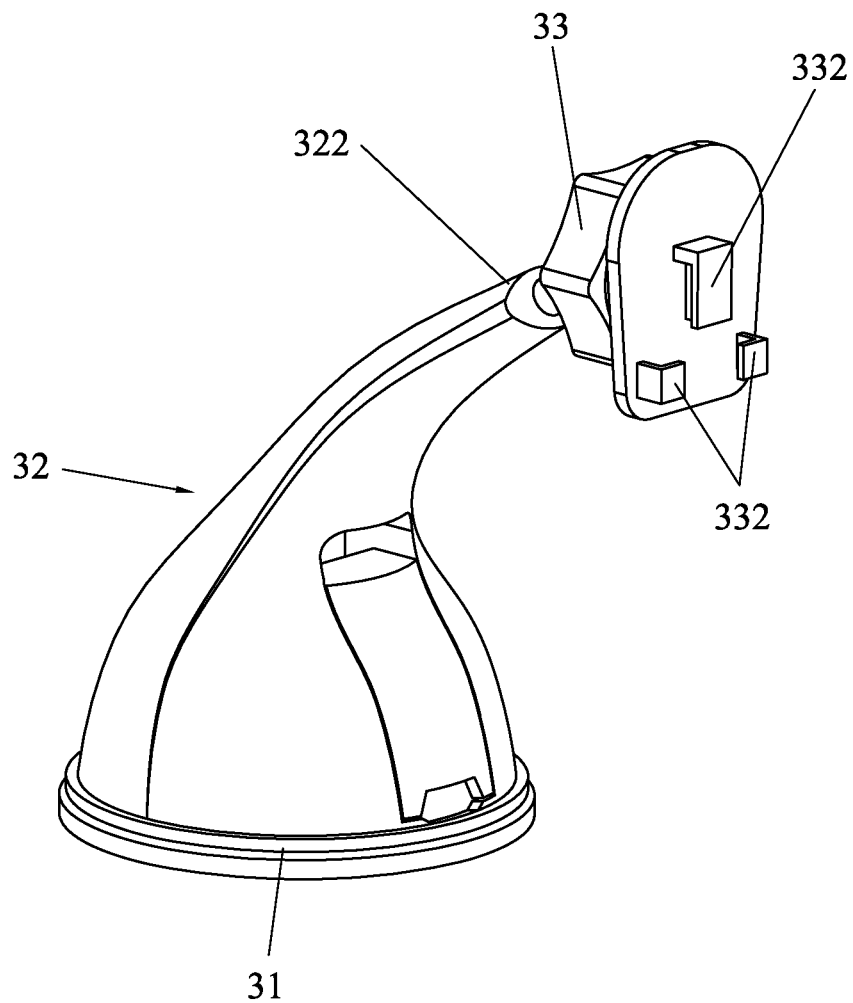
FIG. 12 is a perspective view showing the assembly of a steady holder for matching with the protective case for the electronic equipment according to the second embodiment of the present invention.
Figure 13:
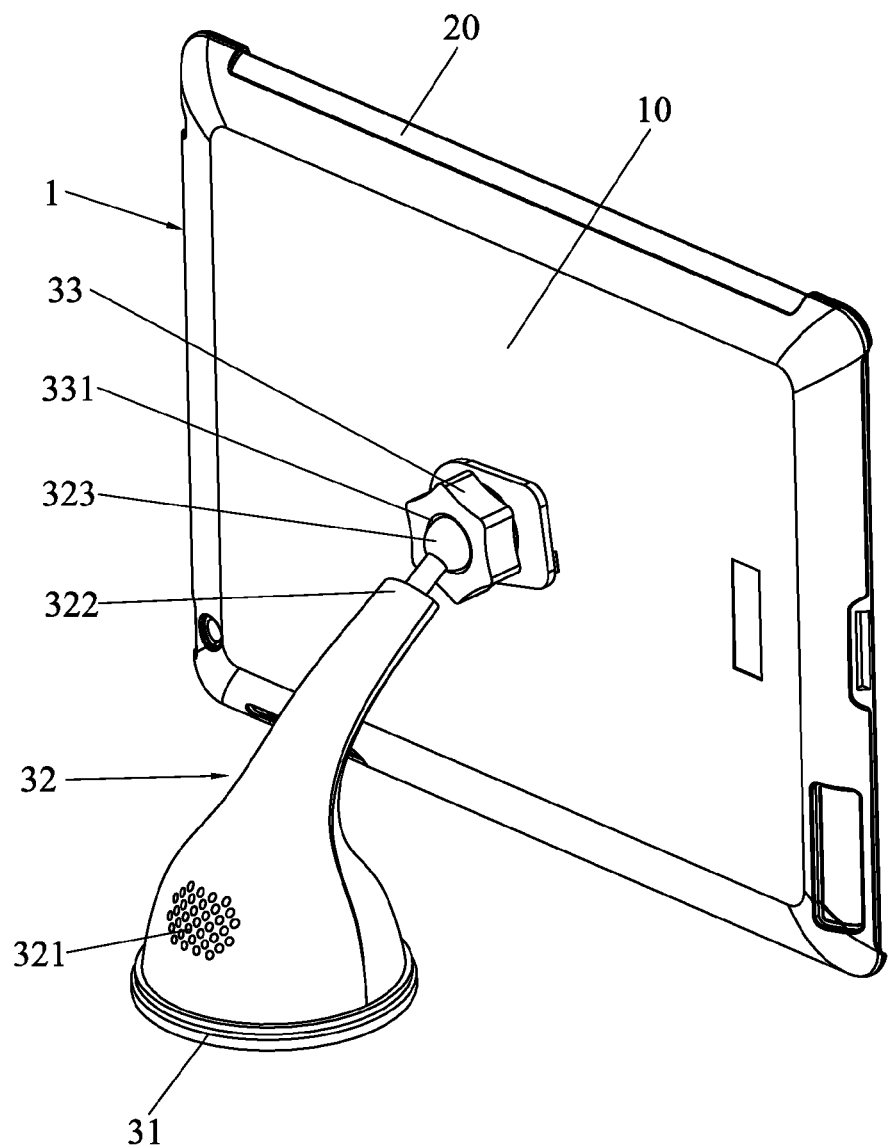
FIG. 13 is a perspective view showing the application of the steady holder and the protective case for the electronic equipment according to the second embodiment of the present invention.

With reference to FIGS. 11-13, a difference of a protective case 1 of a second embodiment from that of the first embodiment of the present invention comprises the locking mechanism 62 mounted on a back surface of a body 10 so as to lock with a steady holder, thus erecting the electronic equipment.

In this embodiment, the steady holder is a bluetooth swivel bracket 3, wherein the bluetooth swivel bracket 3 includes a sucker 31, a holding stand 32, a universal swivel head 33, and a bluetooth mechanism (not shown) disposed in the holding stand 32. An upper end 322 of the holding stand 32 is universally pivoted with the universal swivel head 33, and the universal swivel head 33 is movably retain with the locking mechanism 62, wherein the bluetooth mechanism has a bluetooth module, a speaker, and a power supply element for supplying power source. The power supply element and the speaker are electrically connected with the bluetooth module, and the bluetooth module is provided to receive audio information of electronic equipment, and the audio information is played by the speaker.

The upper end 322 of the holding stand 32 is spherical and has a rotating ball 323 formed thereon. The universal swivel head 33 has a spherical chamber 331 defined therein so as to receive the rotating ball 323, and the rotating ball 323 is universally rotated into the spherical chamber 331, such that the electronic equipment universally rotates relative to the bluetooth swivel bracket 3. In addition, the universal swivel head 33 has a plurality of locating lugs 332 extending outwardly, and the locking mechanism 62 has plural orifices 621 defined thereon and matching with the plurality of locating lugs 332, such that the plurality of locating lugs 332 are movably retained with the plural orifices 621 so that the bluetooth swivel bracket 3 supports the protective case 1.

The holding stand 32 also has a plurality of guiding orifices 321 arranged on a predetermined area thereof corresponding to the speaker so that sounds transmit out of the plurality of guiding orifices 321 via the speaker. Also, exterior sounds transmit into the receiver of the holding stand 32 through the plurality of guiding orifices 321 so that the user hears the sounds clearly.

The sucker 31 of the bluetooth swivel bracket 3 is mounted on a bottom end of the holding stand 32 so as to position the bluetooth swivel bracket 3 stably.

Preferably, the holding stand 32 is bent so that it does not interfere the electronic equipment when the electronic equipment rotates, thereby increasing rotating angle and position of the bluetooth swivel bracket 3.

Figure 14:
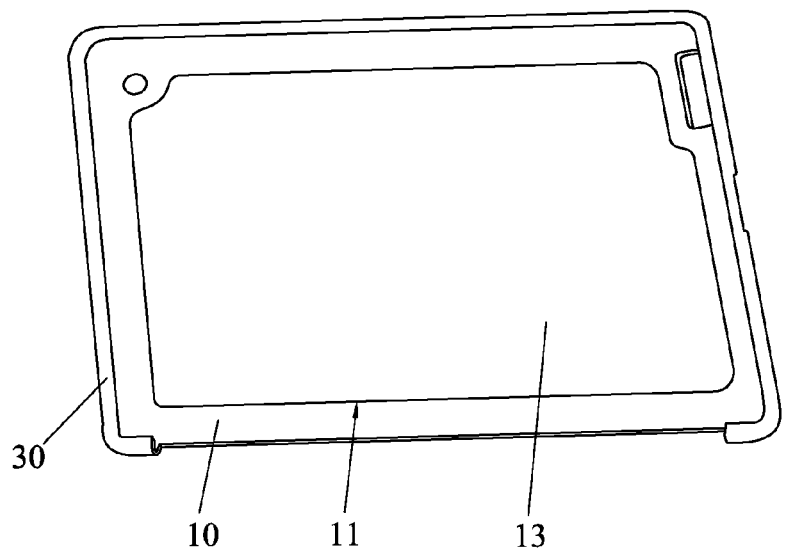
FIG. 14 is a perspective view showing the assembly of a protective case for electronic equipment according to a third embodiment of the present invention.
Figure 15:
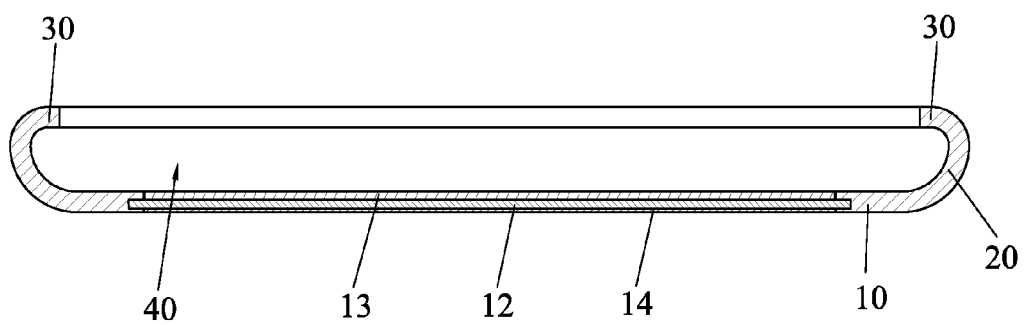
FIG. 15 is a cross sectional view of FIG. 14.
Figure 16:
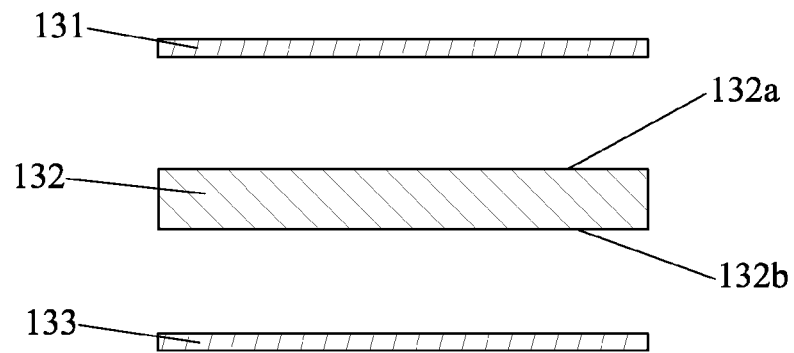
FIG. 16 is a cross sectional of the exploded components of a dissipating piece of FIG. 15.

Referring to FIGS. 14-16, a protective case 1 for electronic equipment according to a third embodiment of the present invention is used for protecting electronic equipment, dissipate heat, and prevent from electromagnetic radiation.

The protective case 1 comprises a body 10, a plurality of protecting ribs 20 extending upwardly from a peripheral side of the body 10, and a securing structure for retaining with the electronic equipment. The securing structure includes plural retaining portions 30 bending inwardly from free ends of the plurality of protecting ribs 20, and among the body 10, the plurality of protecting ribs 20 and the plural retaining portions 30 is defined an accommodating space 40 for receiving the electronic equipment, such that after the electronic equipment is received in the accommodating space 40, the plural retaining portions 30 are retained with a peripheral side of the electronic equipment fixedly.

Furthermore, the body 10 is coupled with a first retainer, and the electronic equipment includes a second retainer fixed thereon so as to retain with the first retainer of the body 10.

As shown in FIGS. 14-16, the body 10 includes a pore 11 arranged thereon and having a metal plate 12 secured in the pore 11. The metal plate 12 has a Nano heat dissipation layer 14 disposed on a back surface thereon and an outer wall of the protective case 1, such that the electronic equipment is accommodated in the accommodating space 40 and contacts with the metal plate 12 so as to dissipate heat and lower temperature, and the Nano heat dissipation layer 14 can prevent from electromagnetic radiation.

The metal plate 12 has an external rim retained in the body 10 and the Nano heat dissipation layer 14 disposed on the back surface thereof, wherein an area of the Nano heat dissipation layer 14 corresponds to a size of the pore 11, such that the metal plate 12 conducts heat of the electronic equipment to the Nano heat dissipation layer 14, and then the Nano heat dissipation layer 14 dissipates the heat to air. Preferably, the metal plate 12 is made of any one of aluminum, silver and copper.

Preferably, the metal plate 12 also has a dissipating piece arranged on a front surface thereof and fixed in the accommodating space 40, wherein a back surface of the dissipating piece 13 connects with the front surface of the metal plate 12, and a front surface of the dissipating piece 13 contacts with the electronic equipment, and wherein an area of the metal plate 12 is larger than that of the dissipating piece 13. Since the metal plate 12 has heat conductivity and its area is larger than that of the dissipating piece 13, the heat of the electronic equipment dissipates to air via the metal plate 12 quickly.

As shown in FIG. 16, the dissipating piece 13 has a heat conducting layer 131, a carrying layer 132, and a heat removing layer 133. The carrying layer 132 has a first face 132a and a second face 132b opposite to the first face 132a, the heat conducting layer 131 is in connection with the first face 132a of the carrying layer 132, the heat removing layer 133 couples with the second face 132b of the carrying layer 132, and the heat removing layer 133 connects with the second face 132b of the carrying layer 132, the heat removing layer 133 joins with the front surface of the metal plate 12, such that the heat removing layer 131 contacts with the electronic equipment so that the heat of the electronic equipment is conducted to the carrying layer 132 quickly, and then the heat conducts to the metal plate 12 through the heat removing layer 133.

It is preferred that the dissipating piece 13 has a film formed on the front surface thereof and made of metal material, such as silver. In addition, the film can be also made of other heat conducting materials.

Figure 17:
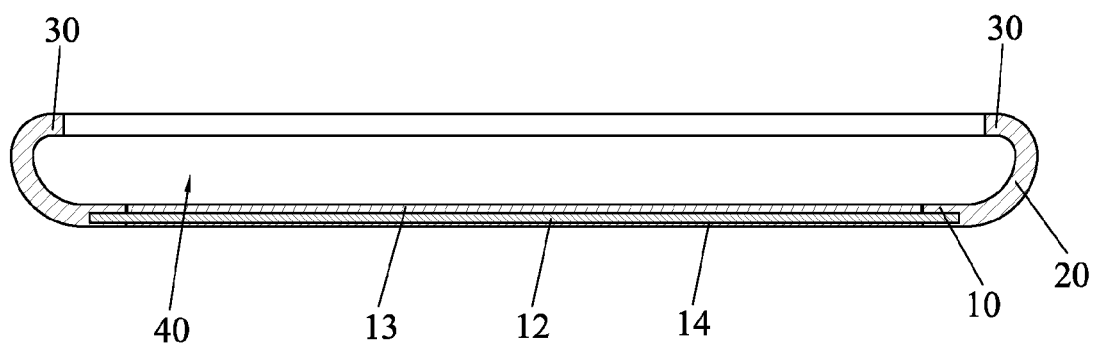
FIG. 17 is a cross sectional view showing the assembly of a protective case for electronic equipment according to a fourth embodiment of the present invention.

Referring to FIG. 17, a difference of a protective case 1 of a fourth embodiment from that of the third embodiment comprises: a metal plate 12 having an external rim extending outwardly to an inner side of the body 10, wherein an area of the metal plate 12 of the fourth embodiment is larger than that of dissipating piece 13, thus cooling temperature excellently.

Figure 18:
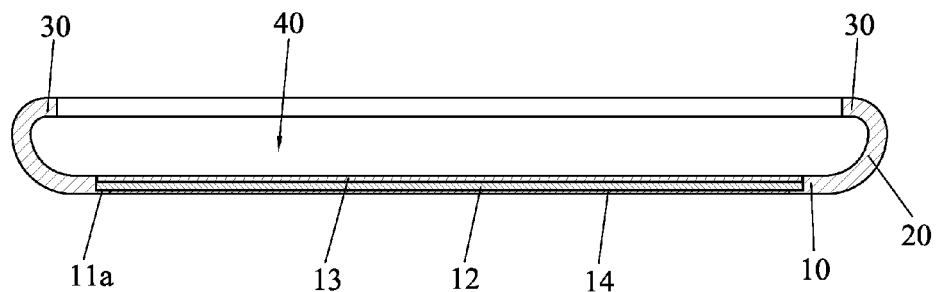
FIG. 18 is a cross sectional view showing the assembly of a protective case for electronic equipment according to a fifth embodiment of the present invention.

As illustrated in FIG. 18, a difference of a protective case 1 of a fifth embodiment from that of each of the third embodiment and the fourth embodiment comprises: a body 10 including a pore 11, and the pore 11 having a stepped recess 11a being concaved downwardly along a peripheral side thereof; a metal plate 12 having a back surface, and the back surface of the metal plate 12 having an outer fringe adhering with the stepped recess 11a, and wherein an area of the back surface of the metal plate 12 beside the outer fringe of the back surface of the metal plate 12 has a Nano heat dissipation layer 14 fixed thereon, the Nano heat dissipation layer 14 has a dissipating piece 13 arranged on a front surface thereof (as shown in FIG. 18).

Figure 19:
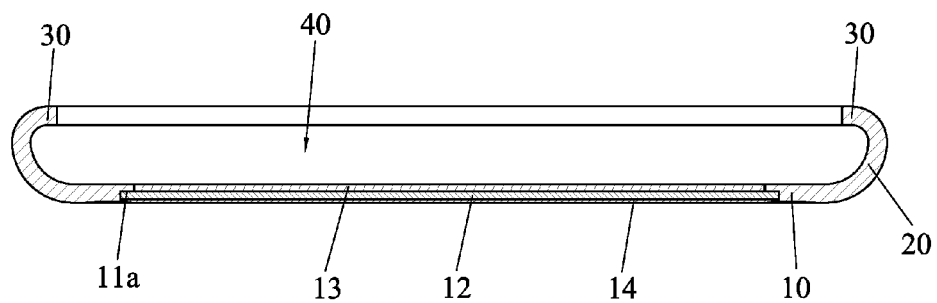
FIG. 19 is a cross sectional view showing the assembly of a protective case for electronic equipment according to a sixth embodiment of the present invention.

As shown in FIG. 19, a difference of a protective case 1 of a sixth embodiment from that of each of the third embodiment and the fourth embodiment comprises: a body 10 including a pore 11, and the pore 11 having a stepped recess 11a being concaved upwardly along a peripheral side thereof, such that an outer fringe of a front surface of a metal plate 12 adheres with the stepped recess 11a, and wherein the front surface of the metal plate 12 has the dissipating piece 13 arranged thereon, a back surface of the metal plate 12 has a Nano heat dissipation layer 14 formed thereon.

The body 10 also includes the metal plates 12a mounted thereon, and the metal plates 12 has the Nano heat dissipation layer 14 fixed on the back surface thereof and the dissipating piece 13 secured on the front surface thereof, such that the heat of the electronic equipment is dissipated to the air quickly by ways of the metal plate 12, the dissipating piece 13 and the Nano heat dissipation layer 14, thus prolonging service life of the electronic equipment. Moreover, the protective case 1 is not removed from the electronic equipment so as to avoid losing the protective case 1. Preferably, the Nano heat dissipation layer 14 can prevent from electromagnetic radiation.

Figure 20:
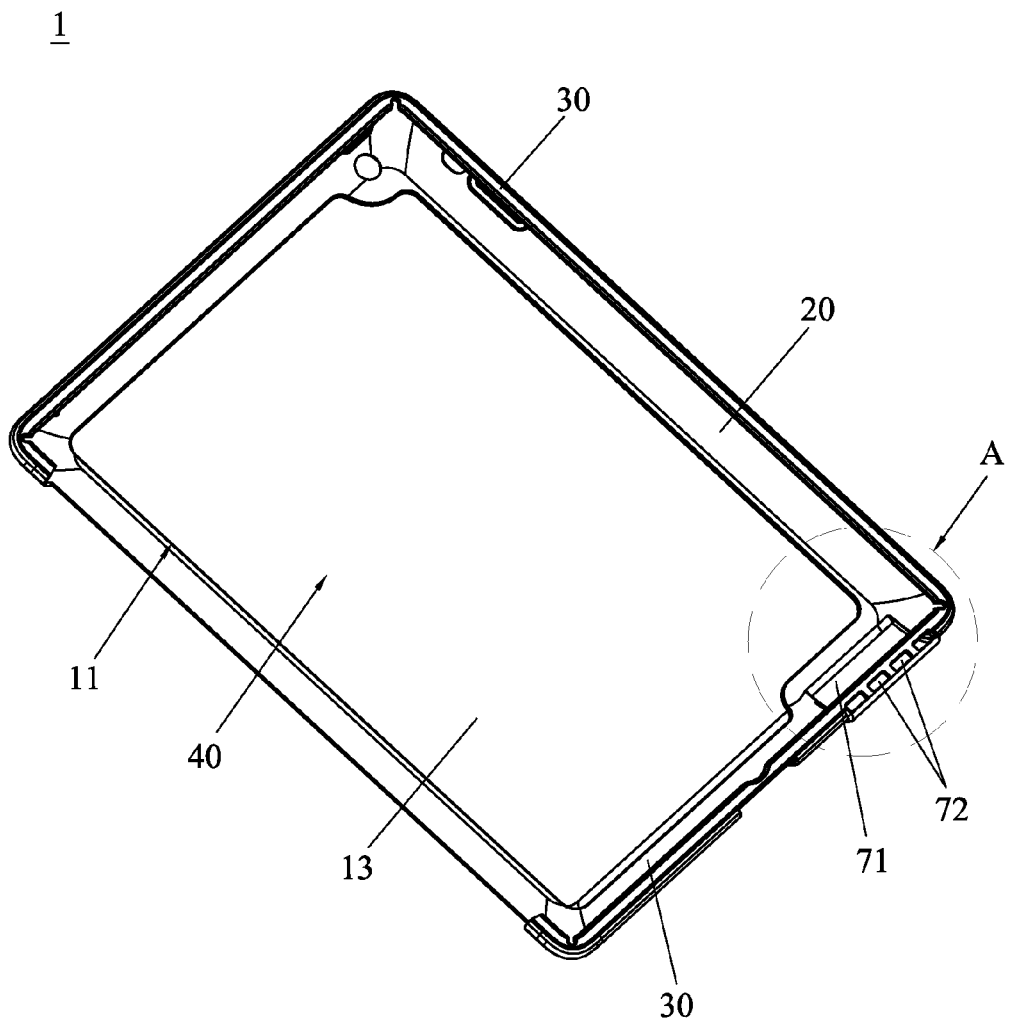
FIG. 20 is a perspective view showing the assembly of a protective case for electronic equipment according to a seventh embodiment of the present invention.
Figure 21:
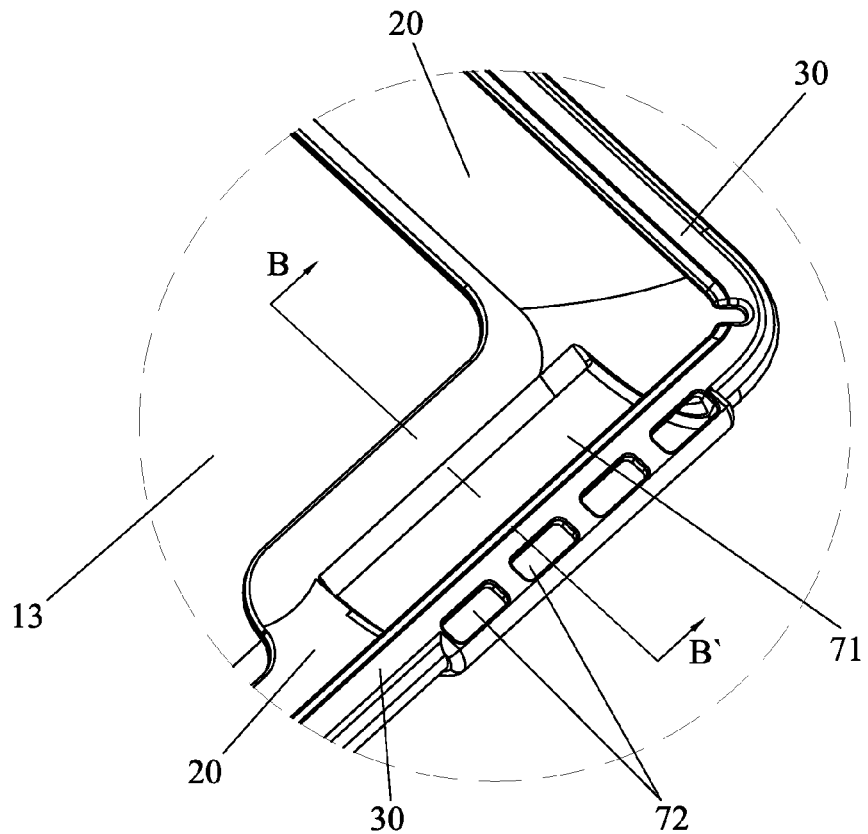
FIG. 21 is an amplified perspective view of a part A of FIG. 20.
Figure 22:
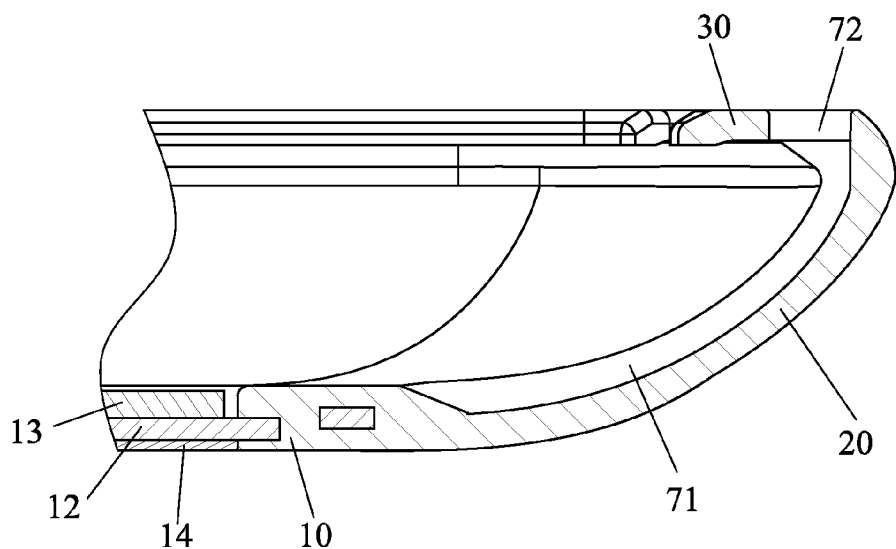
FIG. 22 is a cross sectional view taken along the line B-B' of FIG. 21.

Referring to in FIGS. 20-22, a protective case 1 according to a seventh embodiment of the present invention comprises: a body 10 including a plurality of protecting ribs 20 extending upwardly from a peripheral side of the body 10, plural retaining portions 30 bending inwardly from free ends of the plurality of protecting ribs 20. Among the body 10, the plurality of protecting ribs 20, and the plural retaining portions 30 is defined an accommodating space 40 for receiving the electronic equipment. The body 10 includes a pore 11, and the pore 11 is arranged to receive a metal plate 12, a dissipating piece 13 and a Nano heat dissipation layer 14. Likewise, the fixing block 50 and the rotary cover 80 are disposed on the body.

When the protective case 1 is fitted on the electronic equipment, a speaker and a microphone of the electronic equipment correspond to one or two of the plurality of protecting ribs 20 of the electronic equipment body based on using requirement.

When the speaker and the microphone correspond to two of the plurality of protecting ribs 20, one of the plurality of protecting ribs 20 has a first guide slot 71 being concaved downwardly therealong and corresponding to the speaker, and one of the plural retaining portions 30 has a plurality sound orifices 72 formed thereon and corresponding to the first guide slot 71; anther of the plurality of protecting ribs 20 has a second guide slot (not shown) being concaved downwardly therealong and corresponding to the microphone, another of the plural retaining portions 30 has a plurality of receiving orifices (not shown) formed thereon and corresponding to the second guide slot. In addition, when the speaker and the microphone are located on a same peripheral side of the electronic equipment, one of the plurality of protecting ribs 20 has a first guide slot 71 and a second guide slot (not shown) corresponding to the speaker and the microphone, and one of the plural retaining portions 30 has a plurality sound orifices 72 formed thereon and corresponding to the first guide slot 71, another of the plural retaining portions 30 also has a plurality receiving orifices (not shown) formed thereon and corresponding to the second guide slot.

Thereby, sounds transmit out of the plurality of sound orifices 72 from the speaker via the first guide slot 71 so as to produce heavy bass, and sounds spreading to the back surface of the electronic equipment are conducted to the front surface of the electronic equipment and then transmits out of the plurality of sound orifices 72, hence the electronic equipment produces sounds loudly. It is to be noted that after a user makes sounds, the sounds are conducted to the second guide slot through the plurality of receiving orifices and then transmit to the microphone from the second guising slot, thus collecting the sounds together.

Accordingly, the protective case is served to protect electronic equipment, dissipate heat, and prevent from electromagnetic radiation.

It is to be noted that the protective case of the present invention is also applicable for mobile phones, tablet computers, PDA., etc.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A protective case for electronic equipment comprising: a body, a plurality of protecting ribs extending upwardly from a peripheral side of the body, plural retaining portions bending inwardly from free ends of the plurality of protecting ribs and fastening with the electronic equipment, and the body, the plurality of protecting ribs and the plural retaining portions defining an accommodating space for receiving the electronic equipment, the body including a fixing block disposed on the peripheral side thereof and having a free end extending out of the body, and the fixing block having a first hole formed thereon and corresponding to a second hole of the body, such that the electronic equipment is mounted in the accommodating space so that the plural retaining portions retain with the peripheral side of the electronic equipment, and the fixing block is slid so that a locking portion retains with the peripheral side of the electronic equipment, and the first hole corresponds to the second hole of the body; and a fastening protrusion of a lock is inserted into the second hole and the first hole so that the fixing block is fixed, and the electronic equipment is locked by the plural retaining portions and the locking portion;

wherein the body includes a pore arranged thereon and having a metal plate secured in the pore, the metal plate has a nanomaterial heat dissipation layer disposed on a back surface thereon and an outer wall of the protective case, such that the electronic equipment is accommodated in the accommodating space and contacts with the metal plate;

wherein the nanomaterial heat dissipation layer has a heat conducting layer, a carrying layer, and a heat removing layer; the carrying layer has a first face and a second face opposite to the first face, the heat conducting layer is in connection with the first face of the carrying layer, the heat removing layer couples with the second face of the carrying layer, and the heat removing layer connects with the second face of the carrying layer, the heat removing layer contacts with the electronic equipment so that heat of the electronic equipment is conducted to the carrying layer quickly, and then the heat conducts to the metal plate through the heat removing layer.

2. The protective case for the electronic equipment as claimed in claim 1, wherein the body includes a receiving cavity defined on a back surface thereof and corresponding to the fixing block, and the receiving cavity has an opening for siding the fixing block, hence after the fixing block is received in the receiving cavity, the second hole corresponds to the first hole.

3. The protective case for the electronic equipment as claimed in claim 1, wherein the lock includes a cable, a housing and a fastener; a fastening protrusion and the housing are coupled with two ends of the cable, the housing is applied to accommodate the cable, and the fastener is joined with the housing.

4. The protective case for the electronic equipment as claimed in claim 1, wherein one of the plurality of protecting ribs has a first guide slot being concaved downwardly therealong and corresponding to a speaker, and one of the plural retaining portions has a plurality sound orifices formed thereon and corresponding to the first guide slot.

5. The protective case for the electronic equipment as claimed in claim 1, wherein another of the plurality of protecting ribs has a second guide slot being concaved downwardly therealong and corresponding to a microphone, and another of the plural retaining portions has a plurality of receiving orifices formed thereon and corresponding to the second guide slot.

6. The protective case for the electronic equipment as claimed in claim 1, wherein the body includes a locking mechanism secured on the back surface thereof, the locking mechanism is applied to retain with a steady holder so that the steady holder supports the body.

7. The protective case for the electronic equipment as claimed in claim 6, wherein the steady holder is a bluetooth swivel bracket, wherein the bluetooth swivel bracket includes a holding stand, a universal swivel head, and a bluetooth mechanism disposed in the holding stand; an upper end of the holding stand is universally pivoted with the universal swivel head, and the universal swivel head is movably retain with the locking mechanism, wherein the bluetooth mechanism has a bluetooth module, the speaker, and a power supply element for supplying power source; the power supply element and the speaker are electrically connected with the bluetooth module, and the bluetooth module is provided to receive audio information of electronic equipment, and the audio information is played by the speaker.

8. The protective case for the electronic equipment as claimed in claim 6, wherein the electronic equipment further comprises a rotary cover coupled with one side of the body and corresponding to the body, the cover covers on the body so as to protect the electronic equipment and includes at least one crease line folded to form a support rack, and the electronic equipment on the protective case is placed on a platform so as to view the electronic equipment by ways of the support rack.

9. The protective case for the electronic equipment as claimed in claim 8, wherein the locking structure is an engaging piece connected with the back surface of the body, and between the engaging piece and the back surface of the body is defined an engagement area, and the rotary cover is folded and engaged in the engagement area.

* * * * *